United States Patent [19]

Vande Kopple et al.

[11] Patent Number: 5,251,954
[45] Date of Patent: Oct. 12, 1993

[54] PLASTIC VEHICLE COWLING WITH INTEGRALLY MOLDED SEAL

[75] Inventors: Richard Vande Kopple, Belmont; Ted W. Chittenden; Tokumi Toyota, both of Grand Rapids; Gregory Allchin, Ada, all of Mich.

[73] Assignee: StarCade, Inc., Grand Rapids, Mich.

[21] Appl. No.: 6,720

[22] Filed: Jan. 21, 1993

Related U.S. Application Data

[63] Continuation of Ser. No. 828,412, Jan. 31, 1992, abandoned.

[51] Int. Cl.$^5$ .................................................. B62D 25/10
[52] U.S. Cl. ......................................... 296/192; 296/93; 296/901
[58] Field of Search .................. 296/84.1, 93, 192, 901

[56] References Cited

U.S. PATENT DOCUMENTS

| | | | |
|---|---|---|---|
| 3,845,983 | 11/1974 | Heintz | 296/192 |
| 4,173,362 | 11/1979 | Glover et al. | 285/110 |
| 4,410,479 | 10/1983 | Cyriax | 264/255 |
| 4,444,711 | 4/1984 | Schad | 264/243 |
| 4,460,534 | 7/1984 | Boehm | 264/246 |
| 4,679,845 | 7/1987 | Detampel et al. | 296/901 X |
| 4,709,439 | 12/1987 | Warren et al. | 15/230.16 |
| 4,765,672 | 8/1988 | Weaver | 296/192 X |
| 4,830,807 | 5/1989 | Warren et al. | 264/235 |
| 5,018,998 | 5/1991 | Kato | 440/77 |
| 5,101,531 | 4/1992 | Edwards et al. | 296/192 X |
| 5,108,146 | 4/1992 | Sheppard | 296/192 |

Primary Examiner—David M. Mitchell
Assistant Examiner—Andrew C. Pike
Attorney, Agent, or Firm—Varnum, Riddering, Schmidt & Howlett

[57] ABSTRACT

A vehicle cowling (10) can comprise a generally planar, relatively rigid thermoplastic body (12) which includes an elongated notch (26) extending along its back edge (22). A seal (14) can be received in the notch and integrally molded to the body to securely bond the seal to the body. The seal comprises a soft material relative to the body and provides an interface between the cowling and a vehicle windshield. A plurality of protector pins (34) extend generally perpendicularly from a bottom surface (18) of the body and lie in longitudinally spaced relationship along the back edge of the body. The bosses also comprise a soft material relative to the body. The body is securely clamped between the bosses and portions of the seal in the notch of the body.

14 Claims, 7 Drawing Sheets

PLASTIC VEHICLE COWLING WITH INTEGRALLY MOLDED SEAL

This is a continuation of application Ser. No. 07/828,412 filed Jan. 31, 1992, now abandoned.

BACKGROUND OF THE INVENTION

1. Field of the Invention

This invention relates to a vehicle cowling and a process for producing a vehicle cowling. The cowling is adapted to fit between the windshield and hood of a vehicle. The cowling includes a thermoplastic body made of a generally rigid or hard thermoplastic material and an integral seal made of a relatively soft thermoplastic material. The seal is adapted to provide an interface between the cowling and a vehicle windshield.

2. Description of the Related Art

Automatic cowlings are provided between the hood and windshield of an automobile to "trim out" the area between the hood and the windshield. The cowling typically comprises a rigid body and a seal secured along an edge of the rigid body. The rigid body forms a part of the automobile engine compartment cover and suppresses noise from the engine. The seal provides an interface between the cowling and the lower edge of the automobile windshield.

In the past, cowlings have been made by injection molding a rigid thermoplastic body from filled thermoplastics such as polypropylene and attaching a seal which has been extruded from a rubber polymer or a soft plastic such as polyvinyl chloride. The seal has been manually (sometimes mechanically) adhesively secured, typically with a double-sided adhesive, to a rear edge (the edge closest to the windshield) of the rigid thermoplastic body.

Because the seal is typically manually adhesively secured to the rigid body, the process for making the cowling is labor intensive. Further, adhesion between the rigid body and the seal has not proved to be optimal. It is therefore desirable to reduce the labor costs and improve the adhesion of the two-part cowling.

SUMMARY OF THE INVENTION

The invention relates to a cowling for use in a vehicle between the windshield and hood of the vehicle. The cowling includes a relatively rigid thermoplastic body comprising a top surface, a bottom surface, an elongated front edge, an elongated back edge, and side edges extending from the back edge to the front edge. An elongated notch extends along the back edge. A seal is received in the elongated notch and is integrally molded to the body. The seal is adapted to provide an interface between the cowling and a vehicle windshield, the seal comprising a soft material relative to the body. Preferably, the body comprises polypropylene, and the seal comprises thermoplastic rubber.

In another of its aspects, the invention relates to a cowling comprising a relatively rigid thermoplastic body comprising a top surface, a bottom surface, an elongated front edge, an elongated back edge, and side edges extending from the back edge to the front edge. The cowling includes a seal comprising a soft material relative to the body, the seal being integrally molded to the back edge of the thermoplastic body. The seal is adapted to provide an interface between the cowling and a vehicle windshield. The cowling further includes a plurality of bosses which extend generally perpendicularly from the bottom surface of the body. The bosses lay in longitudinally spaced relationship along the back edge of the body and comprise a soft material relative to the body. The seal and the bosses can comprise the same material and can be integral. The body preferably includes an elongated notch extending along the back edge. A seal is received in the elongated notch and is integrally molded to the body so that the body is clamped between the bosses and portions of the seal in the notch. Preferably, the thermoplastic body comprises polypropylene and the seal comprises thermoplastic rubber.

In yet another of its aspects, the invention relates to a process for making an article having a body of relatively planar shape and having an elongated seal member formed of a softer material along a longitudinal edge of the body. The process includes several steps. First, a mold is prepared so that it has a cavity in the shape of the body. The mold includes a first mold insert which is slidably mounted for reciprocation between a protracted position at which it defines a part of the cavity for the body and a retracted position at which it forms a part of the elongated seal member. Second, the first mold insert is moved to the protracted position to define the body cavity. Next, a molten first resin is injected into the body cavity to fill the body cavity. The first resin is then cooled to thereby form the body of the article. The first mold insert is then moved to the retracted position to define a cavity for the elongated seal member between the longitudinal edge of the body and the first mold insert. A molten second resin is next injected into the seal member cavity to fill the seal member cavity. The second resin is then cooled to a solid state to form a relatively soft seal which is integrally bonded to the body along the longitudinal edge. The composite article can then be cooled and removed from the mold. Preferably, the first resin comprises polypropylene, and the second resin comprises thermoplastic rubber.

The mold used in the process can include a plurality of second mold inserts which are movable generally perpendicularly to the first mold insert between a protracted position at which the second mold inserts are in contact with the first mold insert when the first mold insert is in the protracted position, and a retracted position at which the second mold inserts form a part of the seal member cavity. During the step of injecting the molten first resin into the body cavity, the second mold inserts are in the protracted position. Before the step of injecting the molten second resin into the seal member cavity, the second mold inserts are moved to the retracted position. Preferably, the first and second mold inserts include inclined sidewalls which are adapted to snugly bear against each other when the first and second mold inserts are in the protracted positions to at least partially define the body cavity. The invention also relates to a cowling made according to the above process.

BRIEF DESCRIPTION OF THE DRAWINGS

The invention will now be described with reference to the drawing in which.

DETAILED DESCRIPTION OF THE PREFERRED EMBODIMENTS

Figure 1:
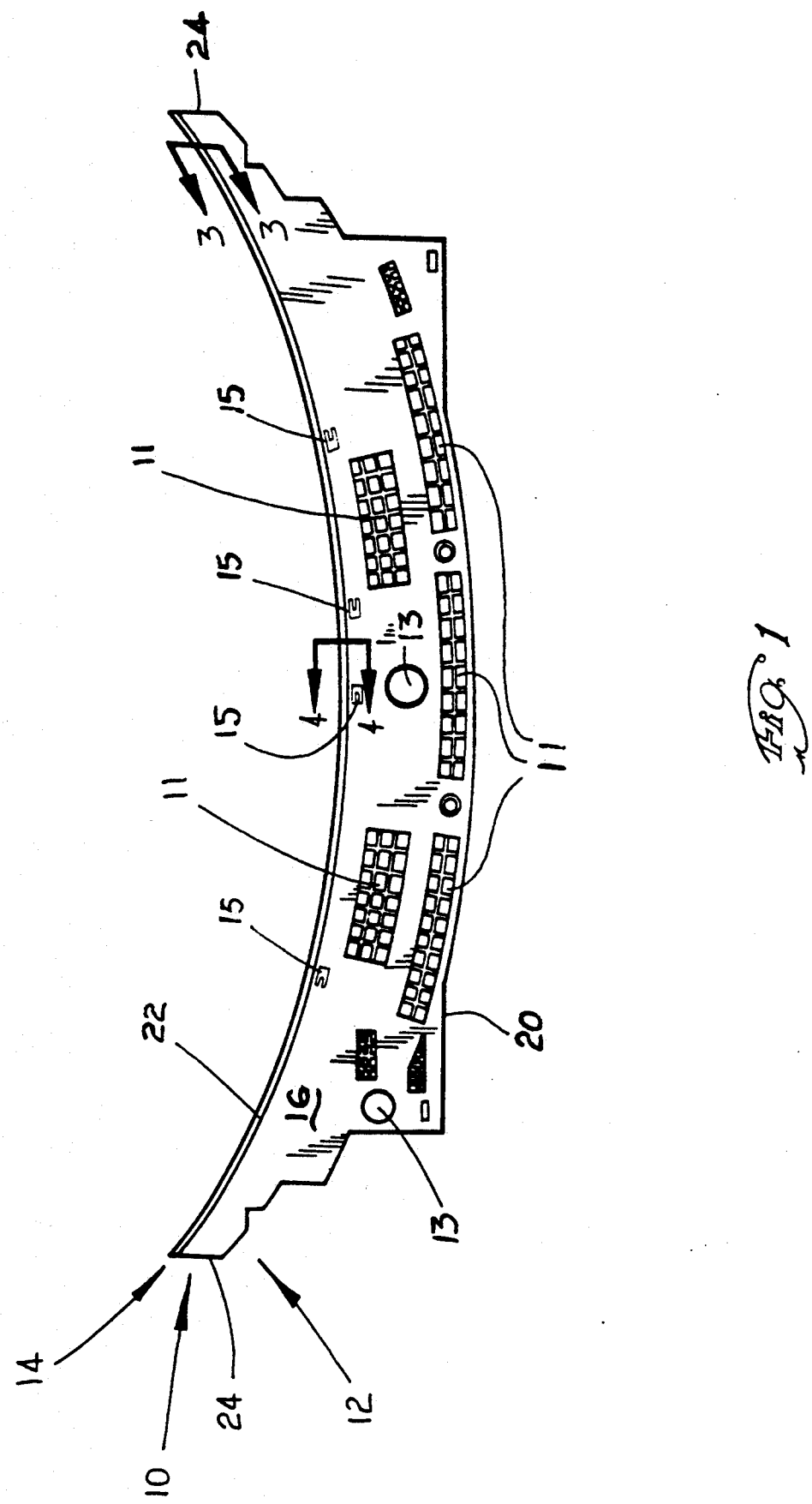
FIG. 1 is a top plan view of an automobile cowling according to the invention.
Figure 11:
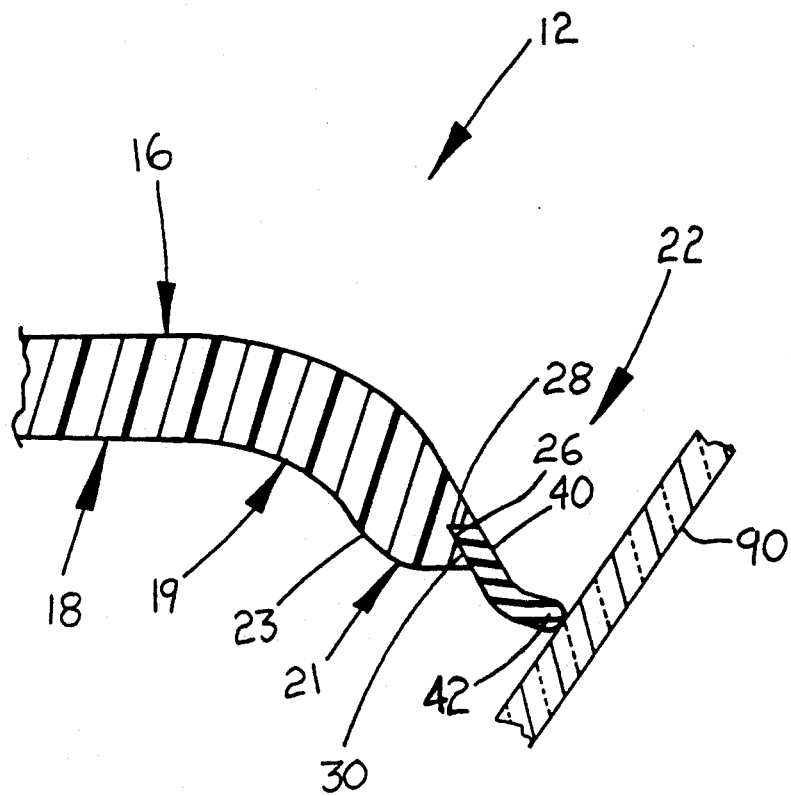
FIG. 11 is a partial sectional view which is similar to FIG. 3 showing the cowling according to the invention in engagement with the windshield.

Referring to FIG. 1, a cowling 10 according to the invention includes a thermoplastic body 12 and a seal 14. The thermoplastic body 12 is adapted to house a vehicle engine and can suppress noise emanating from an engine. As seen in FIG. 11, the seal 14 can provide an interface between the cowling 10 and a vehicle windshield 90 and can conceal certain imperfections in the shape of the glass. The cowling 10 can include air intake opening grates 11, windshield wiper holes 13, and clips 15 which are used to attach the cowling 10 to a vehicle. The vehicle cowling is adapted to fit between the windshield 90 and hood of a vehicle such as an automobile.

All references made herein to the front or rear of the cowling refer to portions of the cowling which are adapted to be disposed relatively far or close, respectively, to the vehicle windshield. In other words, the front of the cowling is adapted to be disposed closer to the front end of the vehicle than to the windshield.

Figure 2:
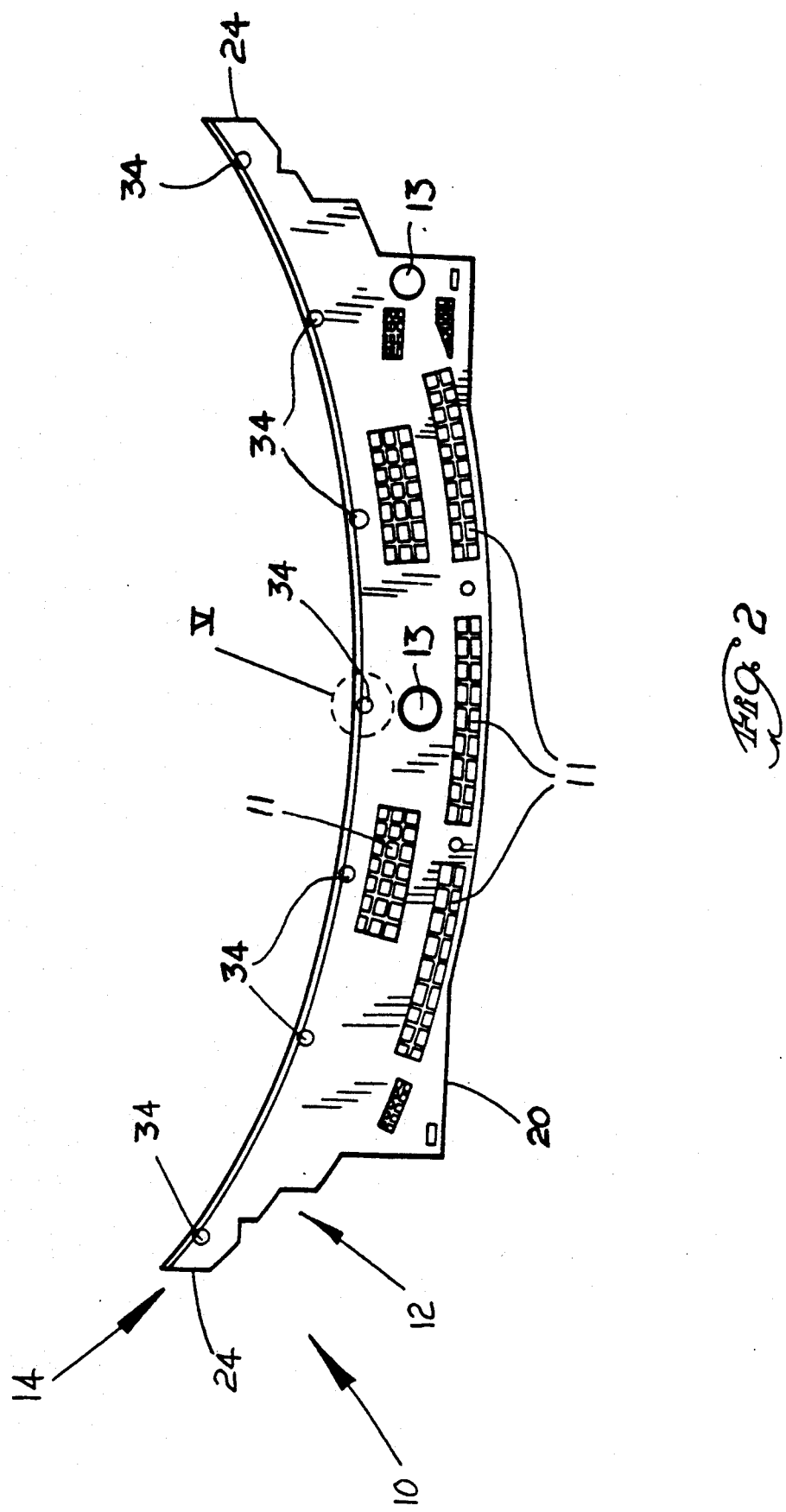
FIG. 2 is a bottom plan view of the cowling of FIG. 1.
Figure 3:
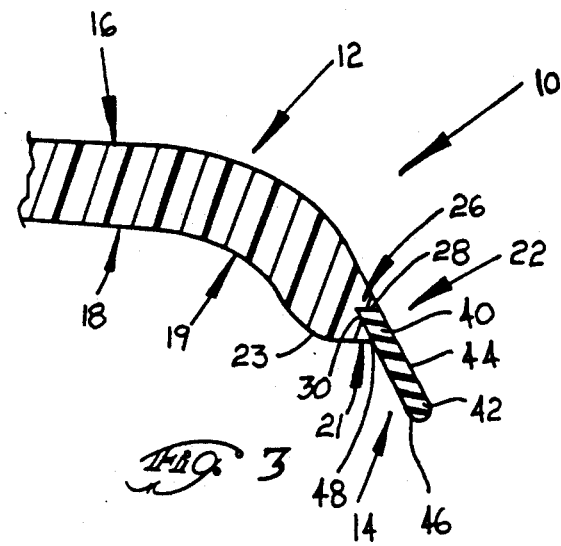
FIG. 3 is a partial sectional view taken along the lines 3—3 of FIG. 1.
Figure 5:
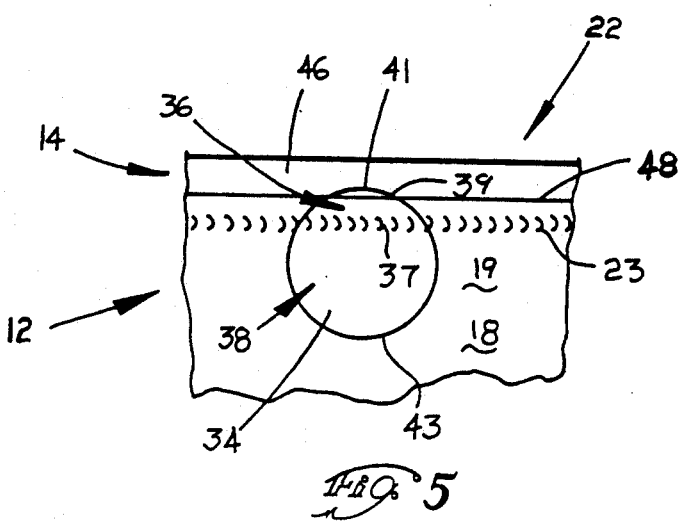
FIG. 5 is an enlarged view of a portion of the cowling identified by the letter A of FIG. 2, showing in detail a boss extending perpendicularly from the bottom surface of the cowling.

The thermoplastic body 12 comprises a top surface 16, a bottom surface 18 (FIG. 2), an elongated front edge 20, an elongated back edge 22, and side edges 24 extending from the back edge 22 to the front edge 20. As shown in FIGS. 3 and 5, the bottom surface 18 can comprise a concave surface 19 and a flat surface 21. A rounded edge 23 can separate the concave surface 19 from the flat surface 21.

Referring to FIG. 3, the thermoplastic body 12 includes an elongated notch 26 which extends along the elongated back edge 22. An upper wall 28 and an adjacent inclined side wall 30 define the elongated notch 26. An upper portion 40 of the seal 14 is integrally bonded to the upper wall 28 and the inclined side wall 30. Thus, the upper portion 40 of the seal 14 is securely clamped to the thermoplastic body 12. The seal 14 has a generally rectangular shape in cross section but can have a rounded bottom portion 42. The seal 14 includes a back wall 44 and a front wall 46. Referring to FIGS. 3 and 5, an elongated edge 48 separates the front wall 46 of the seal 14 from the flat surface 21 of the thermoplastic body 12.

Figure 4:
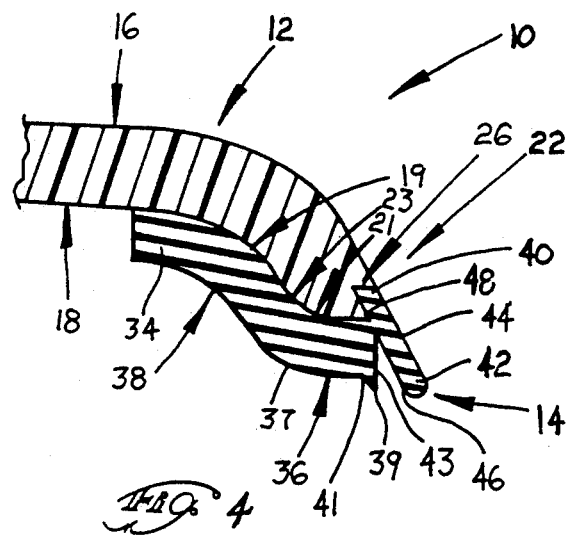
FIG. 4 is a partial sectional view taken along the lines 4—4 of FIG. 1.

Referring to FIGS. 4 and 5, the cowling includes a plurality of (preferably seven) protector pins 34 which are equally spaced from each other along the elongated back edge 22. As shown in FIGS. 2 and 4, the protector pins 34 protrude downwardly from the bottom surface 18 of the thermoplastic body 12.

Referring to FIGS. 4 and 5, the bottom surface of each protector pin 34 comprises a planar segment 36 and an adjacent concave segment 38. A rounded edge 37 separates the planar segment 36 from the concave segment 38. Further, the protector pin 34 includes a small projection 39 which is crescent-shaped in cross section. The small projection 39 is separated from the planar segment 36 by an edge 41 and is integral with a cylindrical side wall 43 of the protector pin 34. The edge 41 lies in the same vertical plane as the elongated edge 48. The protector pins 34 are integral with both the bottom surface 18 of the thermoplastic body 12 and adjacent portions of the seal 14. As shown in FIG. 4, a portion of the thermoplastic body 12 is clamped between each protector pin 34 and adjacent portions of the seal 14 in the elongated notch 26. The protector pins 34 provide structural support for these adjacent portions of the seal 14 and assist in maintaining the seal 14 in clamped engagement with the thermoplastic body 12 along the elongated notch 26.

Each of the protector pins 34 constitutes a downwardly extending boss which provides a support surface for the cowling 10 For example, the vehicle preferably includes a seat (not shown) for the cowling 10, the seat being located beneath the bottom surface 18 of the cowling 10. The bottom surface of each protector pin 34 is adapted to bear against the seat to thereby support the weight of the cowling 10.

Because the protector pins 34 comprise a material which upon hardening is softer than the material of the thermoplastic body 12, the protector pins 34 act as shock absorbers or bushings between the cowling and the cowling seat. Thus, the protector pins 34 can likely reduce rattling noise which may occur when the cowling 10 contacts adjacent parts as a result of road vibration.

The thermoplastic body 12 comprises a thermoplastic material which is generally rigid when it hardens. Preferably, the thermoplastic body 12 comprises a 20% talc-filled polypropylene. The seal 14 and the protector pins 34 comprise a thermoplastic material which upon hardening is softer than the material of the thermoplastic body 12. Preferably, the seal 14 and the protector pins 34 comprise a thermoplastic rubber, such as a thermoplastic rubber sold under the trademark SANTOPRENE or TPR thermoplastic rubber, both of which are available from Monsanto Corporation. Preferably, the seal and the protector pins have a Shore A hardness ranging from about 60 to 80 (most preferably about 65) each measured in accordance with ASTM test standard D2240 with a 5 second delay. The thermoplastic body preferably has a Shore D hardness ranging from about 35 to 75 (most preferably about 75), measured in accordance with ASTM test standard D2240 with no delay.

Figure 6:
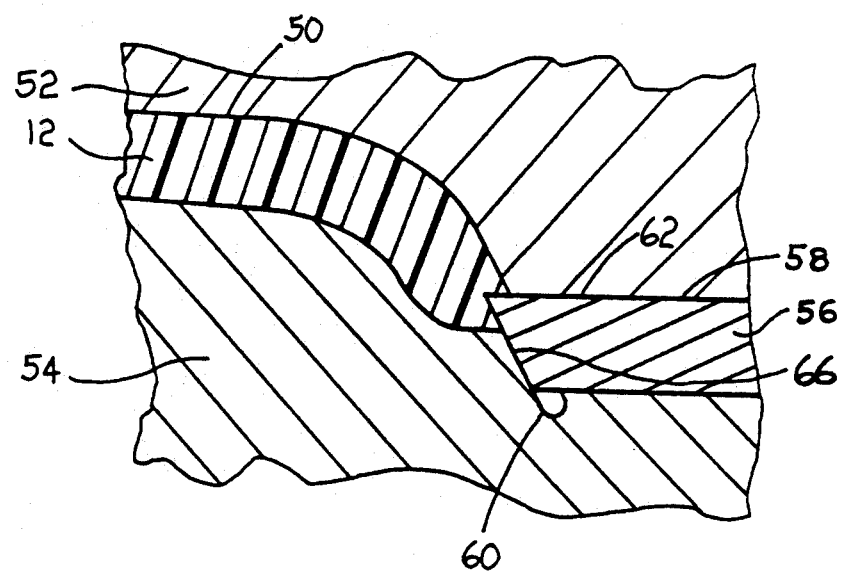
FIG. 6 is a partial sectional view which is similar to FIG. 3, showing a rigid thermoplastic body of the cowling as it appears inside the mold in a first step in the process of making a cowling according to the invention.

The invention also relates to a process for making an article such as the cowling 10, wherein the process comprises a dual injection molding process. Referring to FIG. 6, the process requires a mold comprising a first mold half 52 and a second mold half 54 which define in part a first mold cavity 50. A mold insert in the form of a slide core 56 is adapted to slide in a channel 58 which is formed between and defined by the first mold half 52 and the second mold half 54. The slide core 56 comprises a generally rectangular block or plate which has a top wall 62, a bottom wall 64, and an inclined side wall 66.

Figure 8:
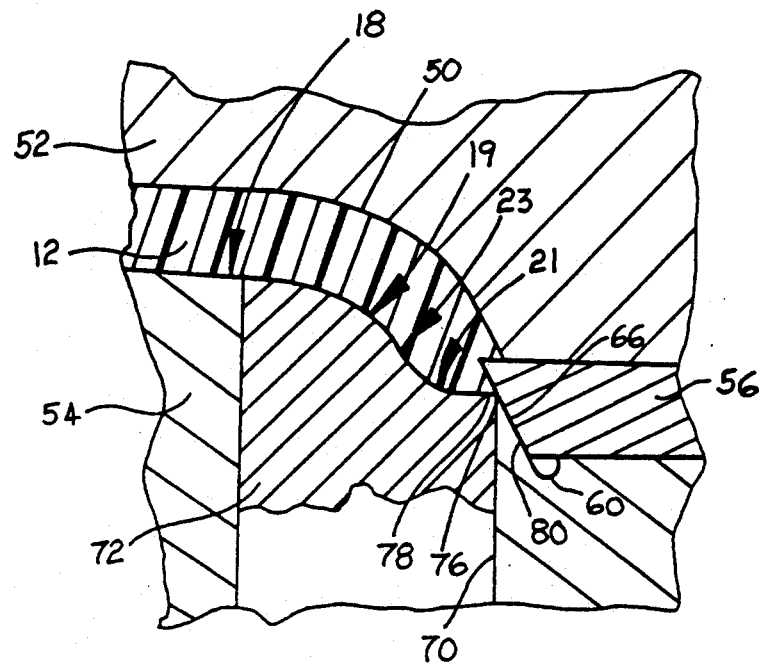
FIG. 8 is a partial sectional view which is similar to FIG. 4, showing the thermoplastic body of the cowling as it appears inside the mold in a first step in the process of making a cowling according to the invention.
Figure 9:
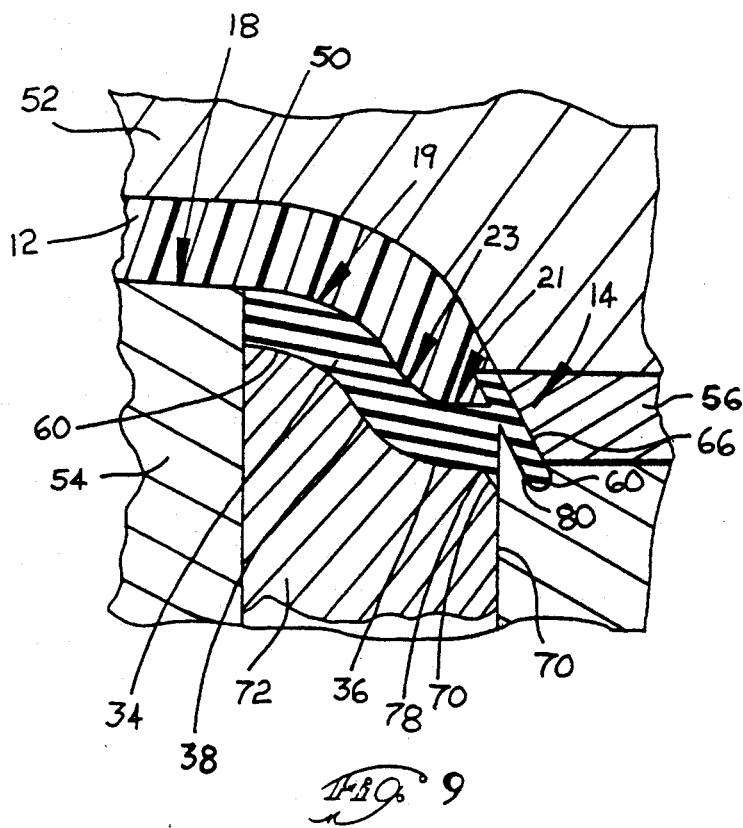
FIG. 9 is a partial sectional view which is similar to FIG. 8, showing the cowling as it appears inside the mold after a second step according to the invention.

Referring to FIG. 8, a second mold insert in the form of a retractable pin 72 includes a cylindrical side wall 70. A top surface of the retractable pin 72 cooperates with other parts of the mold to define a cavity for forming the bottom surface 18 of the thermoplastic body 12, including the concave surface 19, the flat surface 21, and the rounded edge 23. In the area where the slide core 56 and the retractable pin 72 interface, a side of the retractable pin 72 is cut out or sliced at an angle to thereby form an inclined side wall 76. The inclined side wall 76 extends from the cylindrical side wall 70 to the top surface of the retractable pin 72. Further, the inclined side wall 76 extends downwardly at the same angle as does the inclined side wall 66 of the slide core 56. Referring to FIG. 9, an upper edge 78 of the inclined side wall 76 has a length which is equal to the length of the edge 41 (FIG. 5) of the pin 34. The retractable pin 72 moves generally perpendicularly with respect to the slide core 56. The number of retractable pins 72 provided equals the number of protector pins 34 (FIG. 9) formed in the completed cowling.

Referring to FIGS. 6 and 8, the process of the invention requires as an initial step that the slide core 56 be slid inwardly to a protracted position to prevent any communication between the first mold cavity 50 and a partially defined second mold cavity 60 which is adjacent to the first mold cavity 50. Referring to FIG. 8, at this time, the retractable pin 72 can be slid upwardly to its protracted position as shown. When the retractable pin 72 and the slide core 56 are in their protracted positions, the inclined side wall 66 of the slide core 56 snugly bears against the inclined side wall 76 of the retractable pin 72 and an inclined side wall 80 of the second mold half 54.

Figure 7:
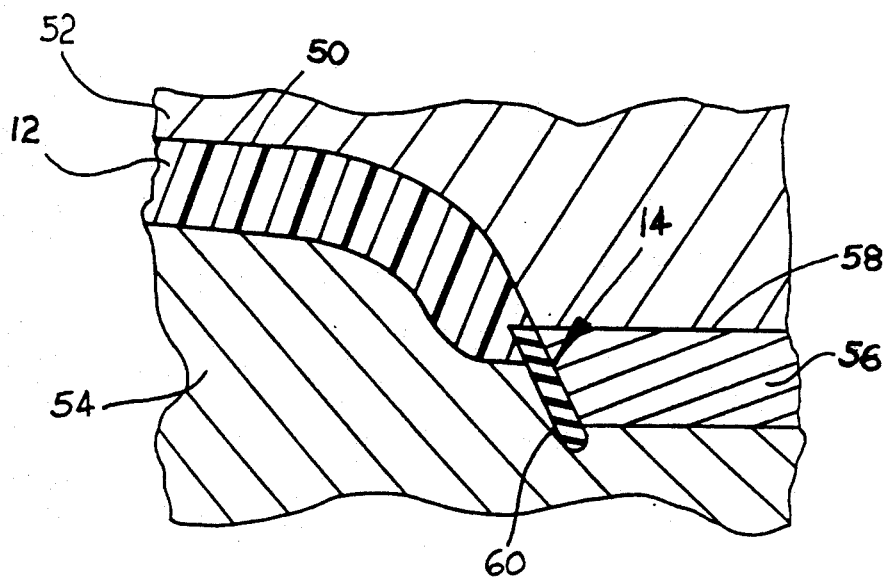
FIG. 7 is a partial sectional view which is similar to FIG. 6, showing the cowling as it appears inside the mold after a second step according to the invention.

After the slide core 56 and the retractable pin 72 have been moved to their protracted positions to thereby completely define the first mold cavity 50, the mold halves 52, 54 can be clamped together at a suitable clamping pressure. A first molten thermoplastic resin, preferably comprising a 20% talc-filled polypropylene, is then injected into the first mold cavity 50. The first mold cavity 50 defines the shape of the thermoplastic body 12 formed therein. The clamping pressure can then be relieved. At this time, the polypropylene has cooled and formed the thermoplastic body 12 of the cowling. Referring to FIGS. 7 and 9, the slide core 56 and the retractable pin 72 (FIG. 9) can be retracted to fully define the second mold cavity 60. The retractable pin 72, the slide core 56, the thermoplastic body 12, and the second mold half 54 cooperate to fully define the second mold cavity 60 when the retractable pin 72 and the slide core 56 have been retracted. Referring to FIG. 9, when the slide core 56 and the retractable pin 72 are moved outwardly to their retracted positions, the inclined side wall 66 of the slide core 56 becomes disengaged from the inclined side wall 7 of the retractable pin 72 and the inclined side wall 80 of the second mold half 54.

Next, a suitable clamping pressure can again be applied to the mold halves. As shown in FIGS. 7 and 9, a second molten thermoplastic resin, which upon hardening is soft relative to the first thermoplastic resin, can then be injected into the second mold cavity 60. Preferably, the second thermoplastic resin comprises a thermoplastic rubber. Upon cooling, the seal 14 and the protector pins 34 (FIG. 9) of the cowling are formed in the second mold cavity 60. The seal 14 and the protector pins 34 integrally bond with the thermoplastic body 12 during the molding operation. The clamping pressure can then be relieved, the mold halves 52, 54 can be separated, and the completed cowling can be removed from the mold. The completed cowling comprises a soft thermoplastic seal integrally bonded to a rigid thermoplastic body through an elongated notch of the thermoplastic body. The completed cowling preferably has the appearance of the cowling 10 shown in FIGS. 1-5.

Figure 10:
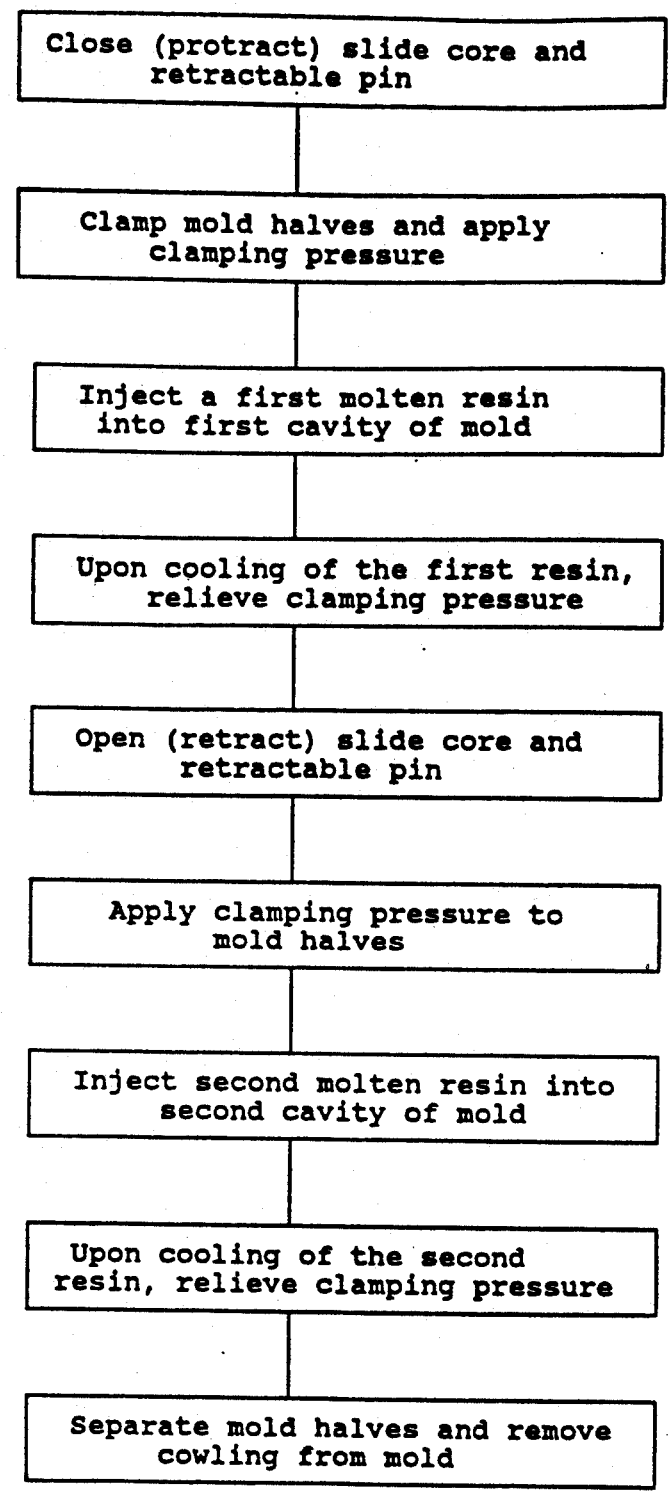
FIG. 10 is a block diagram flow chart illustrating the steps used in making a cowling according to the process of the invention.

FIG. 10 illustrates the steps carried out in making a cowling according to the process of the invention. Referring to FIG. 10, the slide core 56 and the retractable pin 72 are closed initially to thereby completely define the first mold cavity 50 and to prevent any communication between the first mold cavity 50 and the second mold cavity 60. The mold halves 52, 54 can then be clamped together at a suitable clamping pressure, and a first molten thermoplastic resin can be injected into the first mold cavity 50. Upon cooling, the first resin forms the thermoplastic body 12. Next, the clamping pressure can be relieved, and the slide core 56 and the retractable pin 72 can be retracted to fully define the second mold cavity 60.

A suitable clamping pressure can again be applied to the mold halves. A second molten thermoplastic resin, which upon hardening is soft relative to the first resin, can then be injected into the second mold cavity 60. Upon cooling, the seal 14 and the protector pins 34 of the cowling are formed in the second mold cavity 60 and are integrally bonded to the thermoplastic body 12. The clamping pressure can then be relieved, the mold halves 52, 54 can be separated, and the completed cowling can be removed from the mold.

The cowling 10 produced according to the invention is advantageous in comparison to prior art cowlings because it comprises the relatively soft seal 14 which is injection molded into the elongated notch 26 of the thermoplastic body 12. Superior adhesion between the seal 14 and the thermoplastic body 12 is obtained. Further, the process for producing the cowling 10 according to the invention is not labor intensive because the seal 14 is not manually adhesively secured to the thermoplastic body 12 through a double-sided adhesive, but is injection molded against the thermoplastic body 12 so that it integrally bonds with the thermoplastic body 12.

EXAMPLE

The process disclosed in this Example is believed to be the best mode for carrying out the process of the present invention. Consequently, the article produced by this process is believed to be the best article which can be produced according to the present invention.

A cowling comprising a rigid thermoplastic body and a relatively soft seal integrally bonded into an elongated notch of the thermoplastic body was made by providing a mold as shown in FIGS. 6-10. The mold had mold halves similar to the mold halves 52, 54 and mold inserts similar to the slide core 56 and the retractable pin 72. These mold inserts were protracted to fully define a first mold cavity in the mold. The mold halves were closed tightly by an injection molding apparatus which had a clamping tonnage of about 660 U.S. tons.

A measured shot (approximately 11.4 in³) of a 20% talc-filled polypropylene (purchased from C & C Tech Corporation and sold under the tradename 7F10A-1) was heated to a temperature of 446° F. and injected into the first cavity of the mold (the mold temperature was 70° F.) at an injection pressure of about 12,140 psig. As soon as the injection of the polypropylene terminated, the clamping pressure of the injection molding apparatus was relieved. A rigid thermoplastic body had formed in the first mold cavity. The mold inserts were then retracted to fully define a second mold cavity in the mold, the second mold cavity being adjacent to the first mold cavity.

Clamping pressure was again applied to the mold halves by the injection molding apparatus. Approximately 7 seconds after the injection of the polypropylene had been completed, a measured shot (approximately 3.2 in³) of a thermoplastic rubber (purchased from Monsato Corporation and sold under the trademark SANTOPRENE 201-64) which had been heated to a temperature of 428° to 446° F. was injected into the second cavity of the mold at an injection pressure of 19,558 psig. Upon cooling of the thermoplastic materials, the mold clamping pressure was relieved, and the mold halves were separated.

A finished thermoplastic part, a cowling, was then removed from the mold. The part comprised a rigid thermoplastic body and a soft thermoplastic rubber seal, wherein the seal was integrally bonded to the rigid thermoplastic body along an elongated notch of the rigid thermoplastic body. The seal was firmly adhered to the rigid thermoplastic body.

Although the invention has been described with respect to the use of a thermoplastic rubber for the seal, thermosetting rubbers can also be used so long as they can be injection molded and integrally bond to the particular thermoplastic which forms the body of the cowling.

Reasonable variation and modification are possible within the scope of the foregoing specification and drawings without departing from the spirit of the invention.

We claim:

1. A cowling for use in a vehicle between a windshield and a hood of the vehicle, the cowling comprising:
   a relatively rigid thermoplastic body comprising a top surface, a bottom surface, an elongated front edge, an elongated back edge, and side edges extending from the back edge to the front edge, wherein the body includes an elongated notch which extends along the back edge and is substantially L-shaped in cross section; and
   a seal received in the elongated notch and integrally molded to the body, the seal extending outwardly beyond the back edge of the body and the notch, the seal being formed from a material which is soft relative to the body and adapted to provide an interface between the cowling and the vehicle windshield.

2. A cowling according to claim 1 wherein the body comprises polypropylene.

3. A cowling according to claim 1 wherein the body comprises thermoplastic rubber.

4. A cowling for use in a vehicle between a windshield and a hood of the vehicle, the cowling comprising:
   a relatively rigid thermoplastic body comprising a top surface, a bottom surface, an elongated front edge, an elongated back edge, and side edges extending from the back edge to the front edge;
   a seal which is adapted to provide an interface between the cowling and the vehicle windshield, the seal comprising a material which is soft relative to the body, the seal being integrally molded to the back edge of the body; and
   a plurality of bosses which extend generally perpendicularly from the bottom surface of the body and lie in longitudinally spaced relationship along the back edge of the body, the bosses comprising a soft material relative to the body.

5. A cowling according to claim 4 wherein the seal and the bosses comprise the same material and are integral.

6. A cowling according to claim 5 wherein the body includes an elongated notch which extends along the back edge, and the seal is received in the elongated notch and is integrally molded to the body, whereby the body is clamped between the bosses and portions of the seal in the notch.

7. A cowling according to claim 6 wherein the notch is substantially L-shaped in cross section.

8. A cowling according to claim 4 wherein the body comprises polypropylene.

9. A cowling according to claim 4 wherein the seal comprises thermoplastic rubber.

10. A cowling for use in a vehicle between a windshield and a hood of the vehicle, the cowling comprising:
    a relatively rigid thermoplastic body comprising a top surface, a bottom surface, an elongated front edge, an elongated back edge, and side edges extending from the back edge to the front edge;
    an elongated notch which extends along the back edge of the thermoplastic body, the notch being substantially L-shaped in cross section; and
    a seal received in the elongated notch and integrally molded to the body, the seal being adapted to provide an interface between the cowling and the vehicle windshield, the seal comprising a soft material which is soft relative to the body.

11. A cowling according to claim 10 wherein the seal extends beyond the back edge of the body.

12. A cowling according to claim 10 wherein the body comprises polypropylene.

13. A cowling according to claim 10 wherein the seal comprises thermoplastic rubber.

14. A cowling according to claim 10 and further comprising a plurality of bosses which extend generally perpendicularly from the bottom surface of the body and lie in longitudinally spaced relationship along the back edge of the body, the bosses comprising a soft material relative to the body.

* * * * *